Nov. 10, 1925.

W. S. ELLIOTT 1,560,679

WATER HEATING AND CIRCULATING SYSTEM

Original Filed July 2, 1921    3 Sheets-Sheet 1

INVENTOR.

Wm S. Elliott

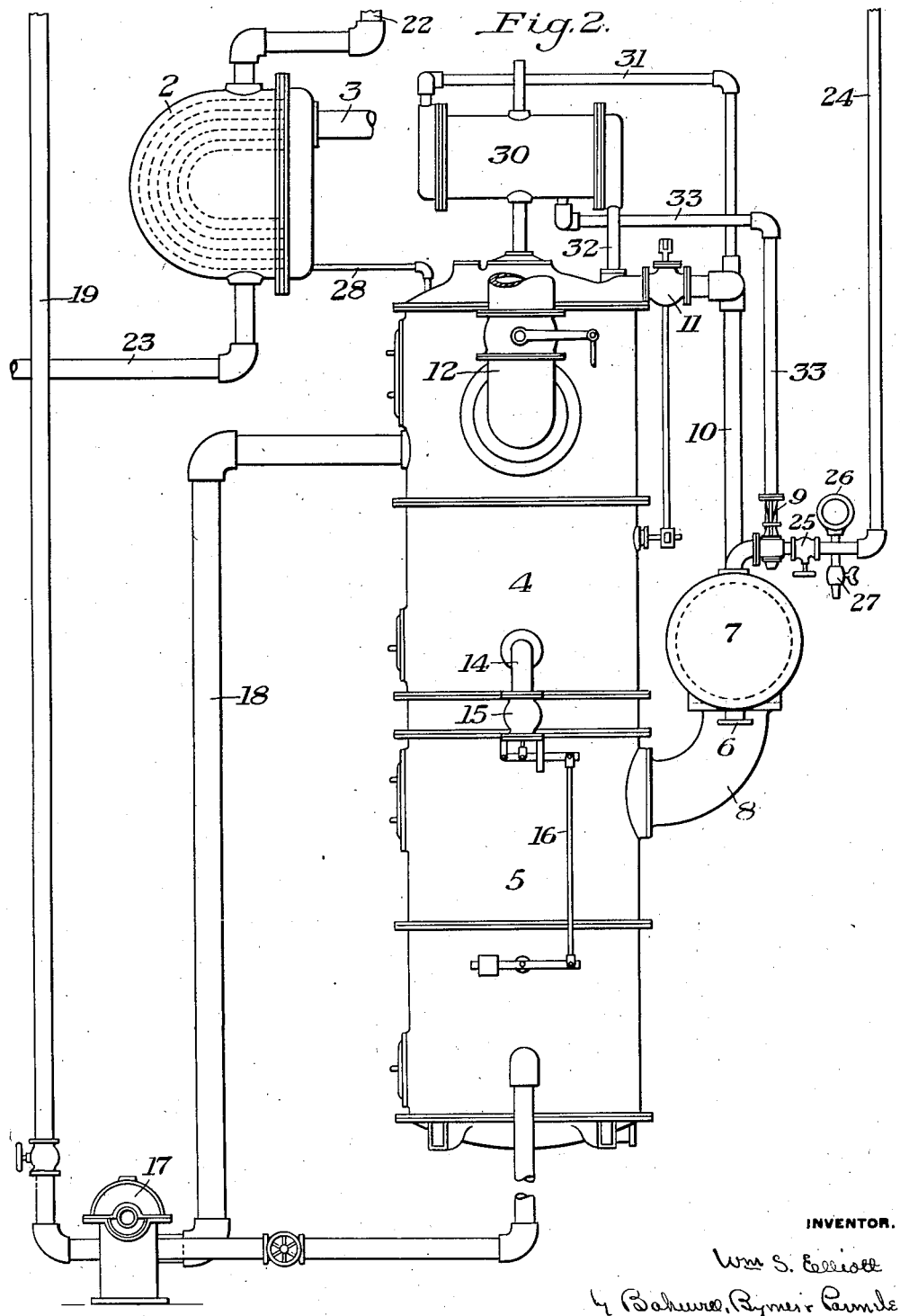

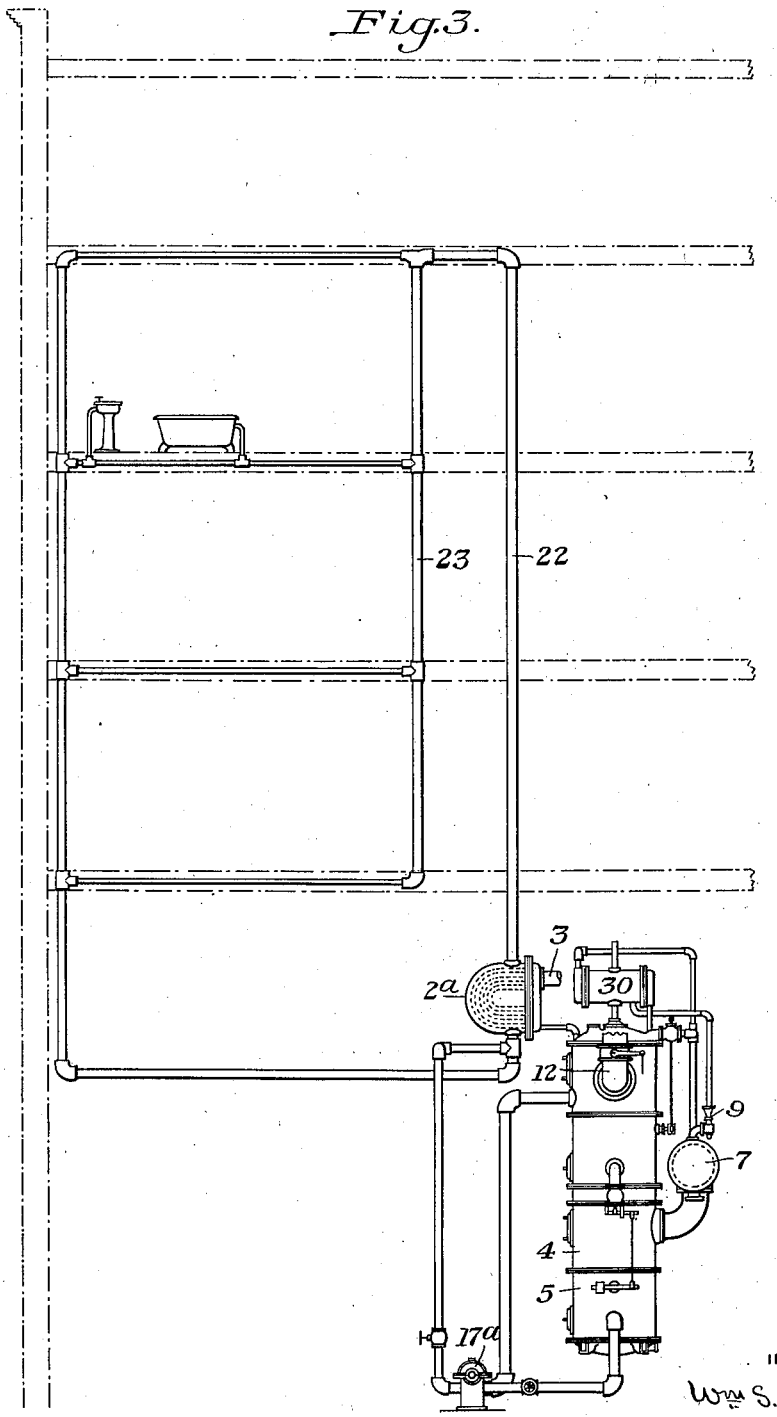

Patented Nov. 10, 1925.

1,560,679

UNITED STATES PATENT OFFICE.

WILLIAM S. ELLIOTT, OF PITTSBURGH, PENNSYLVANIA.

WATER HEATING AND CIRCULATING SYSTEM.

Application filed July 2, 1921, Serial No. 482,279. Renewed March 13, 1924.

*To all whom it may concern:*

Be it known that I, WILLIAM S. ELLIOTT, a citizen of the United States, residing at Pittsburgh, in the county of Allegheny and State of Pennsylvania, have invented a new and useful Improvement in Water Heating and Circulating Systems, of which the following is a full, clear, and exact description, reference being had to the accompanying drawings, forming a part of this specification, in which—

Figure 2 is a similar view of a portion of the system on a larger scale.

Figure 3 is a view similar to Figure 1 but showing a modification.

Figure 1:
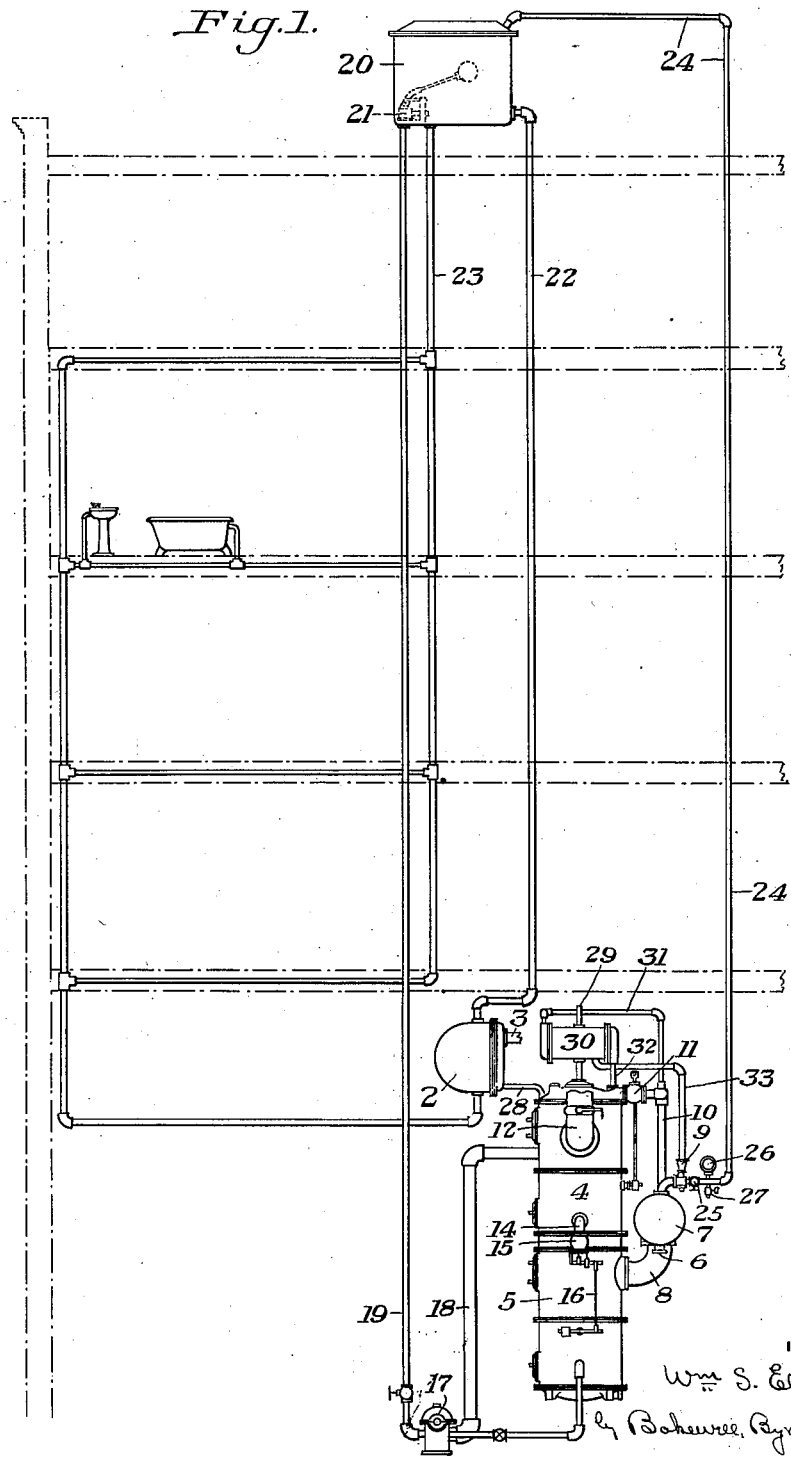
Figure 1 is a view in side elevation, but largely diagrammatic, of a system embodying my invention.

My invention has relation to hot water circuating systems for buildings and is designed to provide a simple, efficient and economical system embodying therein the advantages of the invention described and claimed in my Patent No. 1,321,999, dated November 18, 1919.

In the said patent I have described and claimed a method of treating water and other liquids for the removal of air and other contained gases in an effective manner. The present invention provides for the application of this method of treatment for the removal of air from water used in hot water heating and circulating systems, thereby preventing corrosion in the pipes and fittings of the system.

The nature of my invention will be best understood by reference to the accompanying drawings in which I have illustrated more or less diagrammatically one embodiment thereof, which will now be described, it being understood, however, that the invention is susceptible of various modifications in the details of construction, arrangement and combination of the various parts without departing from the spirit and scope thereof as defined in the appended claims.

In these drawings the numeral 2 designates a water heater of any suitable or usual character such, for instance, as is employed in office and other buildings for supplying water throughout the building. The water in this heater may be heated by means of steam supplied through a connection such as indicated at 3.

4 designates a preheater for the make-up or raw water before it enters the circulating system, and 5 is a separator in which the air and other dissolved gases are removed. This preheater and separator may be of the form described in my said Patent No. 1,321,999.

The cold raw water enters the system at the connection 6 and first passes through the condenser 7 having the connection 8 with the separator 5. In this condenser the water is heated to a certain temperature by the action of the steam and non-condensible gases which are drawn from the separator by the action of an ejector 9. From the condenser 7 the raw water passes by the pipe 10 into the heater 4 under the control of a float operated valve 11. The water is further heated in the heater by the action of exhaust steam, the main supply of which enters the heater through the connection indicated at 12, this connection preferably having a thermostatically controlled valve whereby the temperature of the water in the heater may be maintained substantially uniform. The water passes from the preheater 4 to separator 5 through the connection 14 having a valve 15 controlled through connection 16 operated by a float in the water chamber of the separator. The ejector 9 and condenser 7 operate to maintain a predetermined degree of vacuum in the separator whereby a separation of the air and other dissolved gases contained in the water is effected in the manner more fully described and claimed in my said patent.

The purified water is removed from the water chamber of the separator by means of a pump 17. While this pump may be driven by any suitable motor, I prefer to employ a steam driven pump, the exhaust of the steam engine having a pipe connection 18 with the preheater 4. In this manner, consequently, the heat used in pumping the purified water is largely recovered in heating the raw water supply. The pump 17 has an outlet connection 19 leading into an elevated tank or reservoir 20 which is preferably located at or near the top of the building, or at least at a sufficiently great elevation to maintain a proper circulation through the system. The discharge from the connection 19 into the tank or reservoir 20 is controlled by a floated-operated valve 21 so that a substantially constant quantity of water will at all times be present in said reservoir. When the water in this reservoir reaches a predetermined level, the float operates to close the valve 21 and thereafter the pump 17 runs idly until such time that sufficient water has been used in the system to cause the valve 21 to again open. A pipe 22 connects this tank or reservoir 20 with the heater 2. 23 is a down-comer pipe also connected to the reservoir 20 and having connections leading to the several floors of the building. As the water in the riser pipe 22, which is connected to the heater, is hotter than the return water from the system, an upward circulation is produced, the water rising in the pipe 22 being replaced by the colder water entering the house heater through the pipe 23. A continuous circulation therefore takes place due to the difference in temperature of the water in the pipes 22 and 23.

From the foregoing it will be apparent that the pump 17 will supply an amount of water in proportion to the amount which is consumed in the house system, this supply of water having been first passed through the separator where the air and other gases have been driven off, so that all water traveling through the pipe 22 to the tank will be oxygen and air free and therefore will not cause corrosion, even in iron pipes, when it reaches the distributing part of the system.

The tank 20 is constructed to be as nearly air tight as possible, but should any air leak into the system, this air would have a tendency to accumulate in this tank and thereby contaminate the purified water. I, therefore, connect the upper portion of this tank by a pipe 24 leading to the inlet of the ejector 9 through the valve 25. The pipe 24 is provided with a vacuum gauge 26 and with a petcock 27. This gauge will indicate the amount of vacuum in the tank. Preferably there should always be maintained a vacuum of a few inches in this tank. By observing this gauge any infiltration of air into the tank will be indicated. Any air contained in the tank will be absorbed more or less by the purified water as oxygen-free water has a great affinity for air. This absorption might increase the vacuum in the tank above the desired point, and for the purpose of decreasing this vacuum the petcock 27 can be opened. By this means and by means of the valve 25, the degree of vacuum produced in the tank can be at all times controlled.

The foregoing applies particularly to conditions where the elevation of the tank above the top floor of a building is limited. If the elevation is sufficient so that the water will flow to the top floor under the vacuum conditions such as are maintained in the separator, it is then advisable to maintain this tank under a vacuum equal to the vacuum in the separator, and thus reduce the amount of energy required to pump the water into the tank. As above stated, this vacuum can be regulated at any time by opening the valve 25 to put the tank under the action of the ejector 9.

28 designates an exhaust steam connection from the heater 2 to the heat chamber of the preheater 4, whereby this exhaust steam may also be utilized in the preheater 4. In order to prevent the accumulation of air in the preheater 4, a vent is necessary. To prevent loss of steam through this vent, I provide a vent, which is indicated at 29, which leads from the top of the preheater 4, through an auxiliary condenser 30. This auxiliary condenser 30 is supplied with cooling water by a branch 31 of the water inlet pipe 10 of the heater, there being a water return connection 32 from the auxiliary condenser to the heater. In this manner, any steam escaping through this vent is utilized in heating a portion of the supply water. This auxiliary condenser is also preferably connected by a pipe 33 with the outlet or exhaust of the ejector 9 so that any heat contained in such exhaust may also be utilized in the auxiliary condenser for heating the supply of water.

The operation is as follows:—

Assuming that the raw or supply water enters the condenser 7 at a temperature of 70 degrees Fahrenheit, and is used for condensing the steam coming from the separator, the temperature of this water will be raised in the condenser from 15 to 25 degrees. This water so heated is delivered to the preheater 4 where its temperature is raised to say 182 degrees Fahrenheit. It then passes into the separator 5, through the control valve described, whereupon this temperature immediately drops to about 165 degrees, corresponding to a vacuum of about nineteen inches of mercury, this vacuum being maintained by the condenser. The pump 17 takes this water out of circulation at a pressure corresponding to this nineteen inches of vacuum and delivers it to the tank 20 at the tank pressure. This tank pressure may be substantially atmospheric, but is preferably a pressure corresponding to a vacuum of nineteen inches. The water flows from the tank 20 down the down-comer 23 and replaces the water already in the circulating system as fast as it is used.

In Figure 3 I have shown a modification which differs from the system first described in that the elevated tank or reservoir is omitted, and the pump 17ª is arranged to deliver the purified water directly into the system, preferably at the inlet of the heater 2ª.

The apparatus herein disclosed for effecting the removal of the air, as adapted generally to different systems, is made the subject matter of my divisional application, Serial No. 688,464 filed January 25, 1924.

The advantages of my invention result from the combination with a hot water heating and circulating system of the character described of efficient means for removing air from the raw supply water before it enters the main heater. As more fully described in my said patent, the heat losses in the heater and separator are comparatively small, and the entire system rendered highly economical by the utilization to a maximum extent of the exhaust heat for preheating the water in the preheater 4.

I claim:

1. A hot water heating and circulating system, comprising a water heater, a source of water supply for said heater, a preheater for the water, an air separator into which the preheater discharges, and a pump for taking the purified water from the separator and delivering it to the system as required, substantially as described.

2. A hot water heating and circulating system, comprising a water heater, a source of water supply for said heater, a preheater for the water, an air separator into which the preheater discharges, an elevated reservoir connected to the heater, and a pump for taking the purified water from the separator and delivering it to said reservoir, substantially as described.

3. A hot water heating and circulating system, comprising a water heater, a source of water supply for said heater, a preheater for the water, an air separator into which the preheater discharges, an elevated reservoir connected to the heater, and a pump for taking the purified water from the separator and delivering it to said reservoir, together with means for exhausting air from said reservoir, substantially as described.

4. A hot water heating and circulating system, comprising a water heater, a source of water supply for said heater, a preheater for the water, an air separator into which the preheater discharges, an elevated reservoir connected to the heater, and a pump for taking the purified water from the separator and delivering it to said reservoir, together with means for exhausting air from said reservoir and for regulating the degree of vacuum therein, substantially as described.

5. A hot water heating and circulating system, comprising a water heater, a source of water supply for said heater, a preheater for the water, an air separator into which the preheater discharges, an elevated reservoir connected to the heater, and a pump for taking the purified water from the separator and delivering it to said reservoir, together with means whereby substantially the same degree of vacuum may be maintained in both the separator and the reservoir, substantially as described.

6. A hot water heating and circulating system, comprising a water heater, a source of water supply for said heater, a preheater for the water, an air separator into which the preheater discharges, a steam-driven pump for taking the purified water from the separator and delivering it to the system, and means for conveying the exhaust steam from the pump engine to the said preheater, substantially as described.

7. A hot water heating and circulating system, comprising a water heater, a source of water supply for said heater, a preheater for the water, an air separator into which the preheater discharges, and a pump for taking the purified water from the separator and delivering it to said reservoir, said preheater having a vent, and a condenser through which the vent extends, substantially as described.

8. A hot water heating and circulating system, comprising a water heater, a source of water supply for said heater, a preheater for the water, an air separator into which the preheater discharges, and a pump for taking the purified water from the separator and delivering it to said reservoir, said preheater having a vent and a condenser through which the vent extends, said condenser having a water return connection with the preheater, substantially as described.

9. A hot water heating and circulating system, comprising a water heater, a source of water supply for said heater, a preheater for the water, an air separator into which the heater discharges, and a pump for taking the purified water from the separator and delivering it to the system, together with an exhaust steam connection from the water heater to the preheater, substantially as described.

10. A hot water heating and circulating system, comprising a water heater, a source of water supply for said heater, a preheater for the water, an air separator into which the preheater discharges, a condenser connected to the separator, an ejector connected to the condenser, said preheater having a vent, an auxiliary condenser through which the vent leads, and a connection between the auxiliary condenser and the outlet of the ejector, substantially as described.

11. A hot water heating and circulating system, comprising a water heater, a source of water supply for said heater, a preheater for the water, an air separator into which the preheater discharges, a condenser connected to the separator, means for removing non-condensible gases from the condenser, an auxiliary condenser, a vent leading from the preheater through the auxiliary condenser, and a connection leading from the exhaust of said means to the auxiliary condenser, substantially as described.

12. A hot water heating and circulating system, comprising a water heater, a source of water supply for said heater, a preheater for the water, an air separator into which the preheater discharges, a condenser connected to the separator, an ejector connected to the condenser, said preheater having a vent, an auxiliary condenser through which the vent leads, and a connection between the auxiliary condenser and the outlet of the ejector, said auxiliary condenser having a return connection with the preheater, substantially as described.

13. A hot water heating and circulating system, comprising a water heater, a source of water supply for said heater, a preheater for the water, an air separator into which the preheater discharges, a condenser connected to the separator, means for removing non-condensible gases from the condenser, an auxiliary condenser, a vent leading from the preheater through the auxiliary condenser, and a connection leading from the exhaust of said means to the auxiliary condenser, said auxiliary condenser having a water return connection with the preheater, substantially as described.

14. A hot water heating and circulating system, comprising a main water heater, means interposed in the water supply for said heater for removing air from the water supply to the heater, an elevated tank, a pump for delivering the purified water to said tank, a circulating system connected to said tank, and means for producing a controllable degree of vacuum in said tank, substantially as described.

15. A hot water heating and circulating system, comprising a water heater, a source of raw water supply for said heater, means through which the supply water passes for removing air therefrom, an elevated tank or reservoir, a pump for delivering the water from the air-extracting means to the said tank or reservoir, and means for maintaining a substantially constant volume of water in said tank or reservoir, substantially as described.

16. A hot water heating and circulating system, comprising a water heater, a source of raw water supply for said heater, means through which the supply water passes for removing air therefrom, an elevated tank or reservoir, a pump for delivering the water from the air-extracting means to the said tank or reservoir, and means for maintaining a substantially constant volume of water in said tank or reservoir, together with other means for maintaining a controllable degree of vacuum in said tank or reservoir, substantially as described.

17. A hot water heating and circulating system, comprising a water heater, a source of water supply for said heater, a preheater for the water, an air separator into which the preheater discharges, and a pump for taking the purified water from the separator and delivering it to the circulating system, substantially as described.

18. In a hot water heating and circulating system, means for removing air and other dissolved gases from the feed water supplied to said system, comprising a heater, means for supplying heating steam to the heater, an air vent leading directly from the heating chamber of the heater, and an auxiliary condenser through which the air vent extends, substantially as described.

19. In a hot water heating and circulating system, means for removing air and other dissolved gases from the feed water supplied to said system, comprising a heater, means for supplying heating steam to the heater, means for venting air directly from the heating chamber of the heater, and means for recovering and utilizing the heat carried by the steam escaping with the air, substantially as described.

20. In a hot water heating and circulating system, means for removing air and other dissolved gases from the feed water supplied to said system, comprising a heater, means for supplying heating steam to the heater, means for venting air from the heating chamber of the heater, and means for recovering and utilizing the heat carried by the steam escaping with the air, said means comprising an auxiliary condenser through which the air-venting passage extends, and connections for leading the cooling water through said auxiliary condenser and thence into the heater, substantially as described.

21. In a hot water heating and circulating system, means for removing air and other dissolved gases from the feed water supplied to said system, said means comprising a heater for the feed water, a steam supply connection for the heater, means for venting the heating chamber of the heater, and means in connection with the venting means for utilizing the heat carried by the steam escaping with the air through the venting means in preheating the water supplied to the heater, substantially as described.

22. The combination in a hot water heating and circulating system, of a water heater using steam as a heating medium and having a steam supply connection, said heater having a vent, and means for utilizing the heat of the steam escaping through said vent to preheat water going to the water heater, the condensate from said means returning to said heater, substantially as described.

23. The combination in a hot water heating and circulating system, of a water heater using steam as a heating medium and having a steam supply connection, said heater having a vent, and a heat exchanger in said vent, said heat exchanger returning its condensate to said heater, substantially as described.

24. The combination in a hot water heating and circulating system of a water heater using steam as a heating medium and having a steam supply connection, said heater having a vent, and a heat exchanger in said vent, together with means for leading supply water to the heater through said heat exchanger, substantially as described.

25. The combination in a hot water heating and circulating system, of a steam-heated water heater, a condenser, an ejector connected to the condenser, an auxiliary condenser, and a connection between between the auxiliary condenser and the discharge of the ejector, substantially as described.

26. In a hot water heating and circulating system, a condenser, a steam-operated air ejector for evacuating the condenser and discharging its steam and air into an auxiliary condenser, said auxiliary condenser, and a hot water heater having a vent connected to the auxiliary condenser, substantially as described.

In testimony whereof, I have hereunto set my hand.

WILLIAM S. ELLIOTT.